United States Patent
Yang et al.

(10) Patent No.: US 11,815,710 B1
(45) Date of Patent: Nov. 14, 2023

(54) BACKLIGHT MODULE AND DISPLAY DEVICE

(71) Applicant: HKC CORPORATION LIMITED, Shenzhen (CN)

(72) Inventors: Xiaohui Yang, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/211,297

(22) Filed: Jun. 19, 2023

(51) Int. Cl.
*F21V 8/00* (2006.01)

(52) U.S. Cl.
CPC ......... *G02B 6/0031* (2013.01); *G02B 6/0068* (2013.01); *G02B 6/0085* (2013.01); *G02B 6/0091* (2013.01)

(58) Field of Classification Search
CPC .. G02B 6/0031; G02B 6/0068; G02B 6/0085; G02B 6/0091
See application file for complete search history.

(56) References Cited

U.S. PATENT DOCUMENTS 8,888,356 B2 * 11/2014 Son .................. G02B 6/0028
  362/616
2013/0094242 A1 * 4/2013 Yang ................ G02F 1/133603
  362/602
2013/0271691 A1 10/2013 Yu
2013/0343081 A1 12/2013 Niu et al.
2014/0132885 A1 5/2014 Li
2019/0086600 A1 3/2019 Xie

FOREIGN PATENT DOCUMENTS

| CN | 1688028 A | 10/2005 |
|---|---|---|
| CN | 202253209 U | 5/2012 |
| CN | 203240400 U | 10/2013 |
| CN | 103499068 A | 1/2014 |
| CN | 104714331 A | 6/2015 |
| CN | 104864311 A | 8/2015 |
| CN | 109061938 A | 12/2018 |
| CN | 110109214 A | 8/2019 |
| CN | 211149134 U | 7/2020 |
| CN | 112542088 A | 3/2021 |
| CN | 215729195 U | 2/2022 |
| CN | 114822262 A | 7/2022 |
| CN | 114967228 A | 8/2022 |
| WO | 2014146368 A1 | 9/2014 |
| WO | 2017049877 A1 | 3/2017 |

(Continued)

*Primary Examiner* — Mary Ellen Bowman

(57) ABSTRACT

A backlight module is disclosed and includes: a backplate divided into a border region and a middle region surrounded by the border region, the middle region including a hollow portion; a light guide plate arranged on the backplate and including a light incident side and a light exit side; an optical film arranged on the light exit side; a light bar fixing plate arranged in the hollow portion of the backplate and connected with the backplate; and at least two light bars fixed onto the light bar fixing plate, where light emitting surfaces of the at least two light bars are disposed to face away from each other and perpendicular to the light exit side. The light produced by the at least two light bars enters the light guide plate through the light incident side, and exits the light guide plate from the light exit side.

13 Claims, 3 Drawing Sheets

(56) References Cited

FOREIGN PATENT DOCUMENTS

| WO | 2017080148 A1 | 5/2017 |
|---|---|---|
| WO | 2021190154 A1 | 9/2021 |
| WO | 2021259044 A1 | 12/2021 |
| WO | 2022007053 A1 | 1/2022 |
| WO | 2022104663 A1 | 5/2022 |
| WO | 2022165798 A1 | 8/2022 |

* cited by examiner

BACKLIGHT MODULE AND DISPLAY DEVICE

CROSS-REFERENCE TO RELATED APPLICATIONS

This application claims the priority and benefit of Chinese patent application 2022110926913, titled "Backlight Module and Display Device" and filed Sep. 8, 2022 with China National Intellectual Property Administration, the entire contents of which are incorporated herein by reference.

TECHNICAL FIELD

The present application relates to the technical field of liquid crystal displays, and more particularly relates to a backlight module and a display device.

BACKGROUND

In the edge-lit displays on the market, the basic thickness of the backlight assembly cannot be compressed due to the wiring and heat dissipation requirements of the edge-lit light bar in the backlight assembly. Since the backlight assembly may be disposed on one side of the display, the display adopting this design can only achieve ultra-thin design on three sides, making the side where the backlight assembly is installed very thick, which affects the narrow bezel and thinning of the display device.

SUMMARY

In view of the above, it is therefore one purpose of the present application to provide a backlight module and a display device, which is conducive to the ultra-thin design of all four sides of the display device, thus facilitating the narrow bezel and thinning of the display device.

In some embodiments, the backlight module further includes an auxiliary light bar. The light bar fixing plate includes a connection plate and a fixing portion. The fixing portion protrudes from the connection plate. The connection plate is connected to the backplate. The two light bars are respectively arranged on opposite sides of the fixing portion. The auxiliary light bar is arranged on the side of the fixing portion away from the connection plate. The light emitting surface of the auxiliary light bar is arranged perpendicular to the light emitting surfaces of the light bars, and arranged parallel to the light exit side of the light guide plate.

In some embodiments, the backlight module further includes a light guide column. The number of the light guide columns is equal to the number of the light bars. The light guide column is fixedly connected with the connection plate. A light guide channel is provided in the light guide column, and the light guide channel includes a light-incoming end and a light-outgoing end. The light-incoming end is located at the light exit surface of the light bar, and the light-outgoing end is located at the light incident side of the light guide plate. The light produced by the light bar enters the light guide channel through the light-incoming end, and is emitted from the light-outgoing end to enter the light guide plate.

In some embodiments, a reflective coating is provided in the light guiding channel. The light produced by the light bar enters the light guide channel through the light-incoming end, is reflected by the reflective coating in the light guide channel, and then exits from the light-outgoing end to enter the light guide plate.

In some embodiments, the backlight module further includes a first reflective sheet, a second reflective sheet and a half reflector. The first reflective sheet is located on the side of the light guide plate close to the backplate, and the first reflective sheet reflects light entering the light guide plate. There are two second reflective sheets, and the two second reflective sheets are respectively arranged on both sides of the auxiliary light bar. The half reflector is arranged at the end of the auxiliary light bar away from the fixing portion. Half of the light produced by the auxiliary light bar is reflected by the half-reflector, and the other half is emitted through the half-reflector. The second reflective sheet reflects the light reflected by the half reflector.

In some embodiments, the distance between the light bar and the optical film is greater than the distance between the light guide plate and the optical film. The light guide channel includes a first channel, a second channel and a third channel. The second channel connects the first channel and the third channel. The light-incoming end is located in the first channel. The light-outgoing end is located in the third channel. The third channel includes a first horizontal plane. The first horizontal plane is set close to the optical film, and the first horizontal plane is set perpendicular to the light-outgoing end.

In some embodiments, a dot surface is provided on the first horizontal plane. One end of the dot surface is in contact with the light incident side of the light guide plate, and the other end is in contact with the second reflective sheet. The dot surface includes a plurality of shading strips, and the plurality of shading strips are arranged at intervals.

In some embodiments, two mounting protrusions are provided on the side of the fixing portion away from the connection plate, and the two mounting protrusions are respectively located on both sides of the auxiliary light bar. One end of the second reflective sheet on one side of the auxiliary light bar abuts against the mounting protrusion on the same side of the auxiliary light bar, and the other end of the second reflective sheet abuts against the end of the first horizontal plane on the light guide column on the same side of the auxiliary light bar that is adjacent to the auxiliary light bar. The two second reflective sheets are arranged symmetrically with respect to the auxiliary light bar.

In some embodiments, the backlight module also includes a fixing screw. The middle region of the backplate defines a first connection hole, and the connection plate defines a second connection hole, and the fixing screw passes through the second connection hole and is threadedly connected with the first connection hole so as to connect the backplate and the light bar fixing plate. The connection plate is located on a side of the backplate away from the optical film.

This application further discloses a display device. The display device includes a display panel, a rear case, and the above-mentioned backlight module. A heat dissipation region is provided on the rear case, and the position of the heat dissipation region coincides with the middle region of the backplate.

Compared with the edge-lit display solution, this application provides light for the backlight module through two light bars, where one light bar only needs to provide light for half of the backlight module, which reduces the use intensity of the light bars to a certain extent and prolongs the service life of the backlight module. Furthermore, the two light bars are arranged in the middle of the backplate, so that compared with the edge-lit displays, the display adopting the solution of the present application can realize an ultra-thin design on all four sides, which is convenient for the narrow bezel and thinning of the display device.

This application discloses a backlight module and a display device. The backlight module includes a backplate, a light guide plate, an optical film, a light bar fixing plate, and at least two light bars. The backplate is divided into a border region and a middle region surrounded by the border region. The light guide plate is arranged on the backplate, and the light guide plate includes a light incident side and a light exit side. The optical film is arranged on the light exit side of the light guide plate. There is a hollow portion in the middle region of the backplate, and the light bar fixing plate is arranged in the hollow portion of the backplate and connected with the backplate. The two light bars are fixed to the light bar fixing plate, and the light emitting surfaces of the two light bars are set away from each other, and the light emitting surfaces of the light bars are arranged perpendicular to the light exit side of the light guide plate. The light produced by the two light bars enters the light guide plate through the light incident side, and exits from the light exit side of the light guide plate.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

Figure 1:
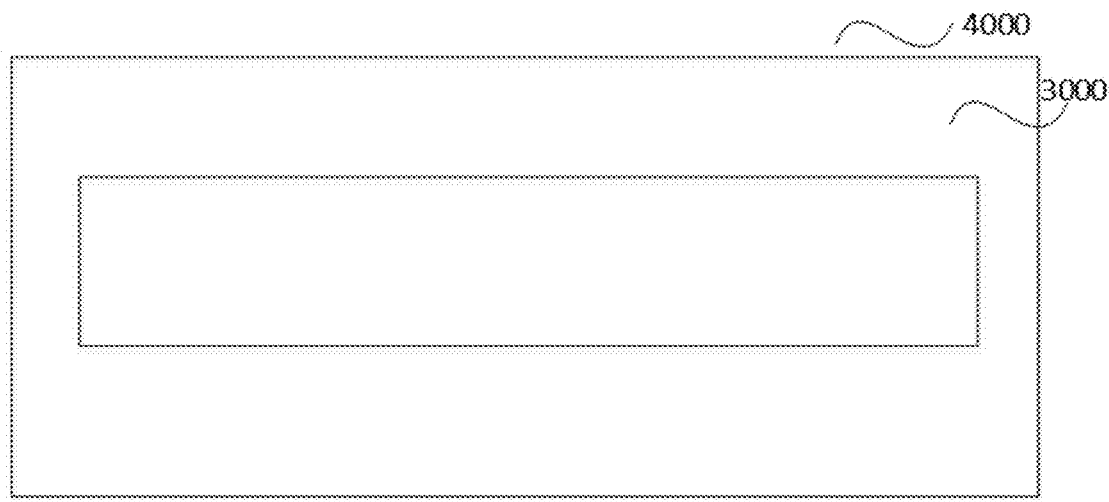
FIG. 1 is a schematic diagram of a display device according to a first embodiment of the present application.

In the drawings: 100, backplate; 110, first connection hole; 200, light guide plate; 210, light incident side; 220, light exit side; 300, optical film; 400, sealant; 500, light bar fixing plate; 510, connection plate; 511, second connection hole; 520, fixing portion; 521, mounting protrusion; 600, light bar; 700, auxiliary light bar; 800, light guide column; 810, light guide channel; 811, light-incoming end; 812, light-outgoing end; 813, reflective coating; 814, first channel; 815, second channel; 816, third channel; 817, first horizontal plane; 818, dot surface; 900, first reflective sheet; 910, second reflective sheet; 920, half reflector; 930, fixing screw; 1000, backlight module; 2000, display panel; 3000, rear case; 4000, display device.

DETAILED DESCRIPTION OF EMBODIMENTS

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. Terms "multiple", "a plurality of", and the like mean two or more. Term "comprising", "including", and any variants thereof mean non-exclusive inclusion, so that one or more other features, integers, steps, operations, units, components, and/or combinations thereof may be present or added.

In addition, terms "center", "transverse", "up", "down", "left", "right", "vertical", "horizontal", "top", "bottom", "inside", "outside", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure.

Furthermore, as used herein, terms "installed on", "mounted on", "connected to", "coupled to", "connected with", and "coupled with" should be understood in a broad sense unless otherwise specified and defined. For example, they may indicate a fixed connection, a detachable connection, or an integral connection. They may denote a mechanical connection, or an electrical connection. They may denote a direct connection, a connection through an intermediate, or an internal connection between two elements. For those of ordinary skill in the art, the specific meanings of the above terms as used in the present application can be understood depending on specific contexts.

The present application will be described in detail below with reference to the accompanying drawings and optional embodiments. It should be noted that, should no conflict is present, the various embodiments or technical features described below can be combined arbitrarily to form new embodiments.

Figure 2:
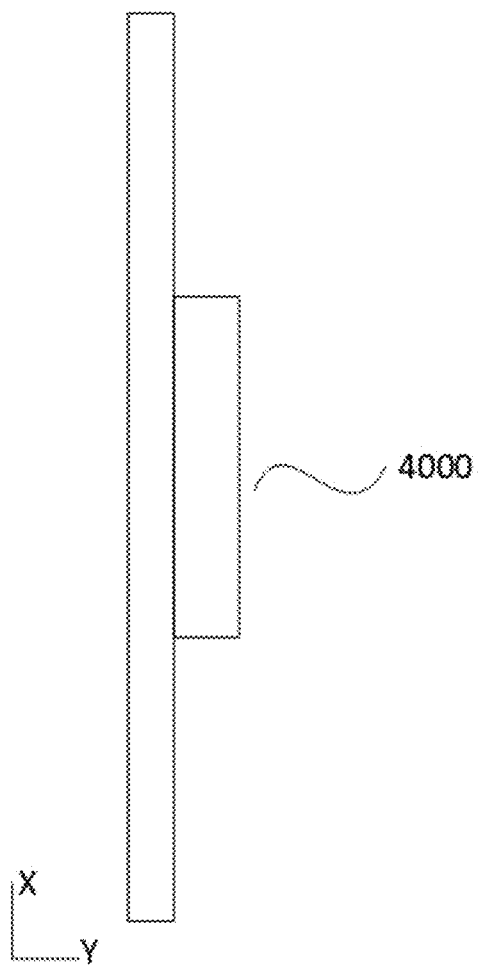
FIG. 2 is a schematic diagram of a display device according to the first embodiment of the present application observed from another viewing angle.
Figure 3:
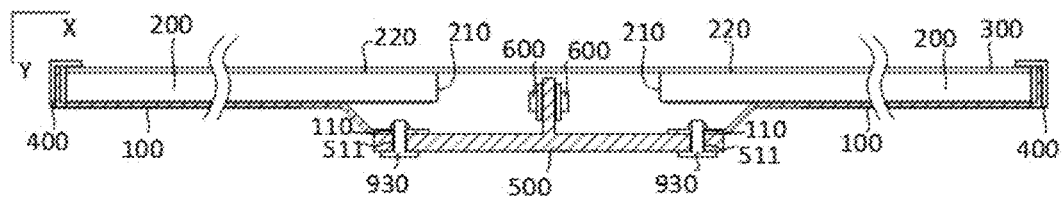
FIG. 3 is a schematic cross-sectional diagram of a backlight module according to the first embodiment of the present application.

FIG. 1 is a schematic diagram of a display device according to a first embodiment of the present application. FIG. 2 is a schematic diagram of the display device according to the first embodiment of the present application observed from another viewing angle. FIG. 3 is a schematic cross-sectional diagram of a backlight module according to the first embodiment of the present application. The x-axis direction shown in the figures is the sky side in a display panel, and the −x-axis direction shown in the figures is the ground side in the display panel. As shown in FIG. 3, as the first embodiment of the present application, a backlight module 1000 is disclosed. The backlight module 1000 is installed in the display device 4000 as is shown in FIG. 1 and FIG. 2. The backlight module 1000 includes a backplate 100, a light guide plate 200, an optical film 300, a sealant 400, a light bar fixing plate 500, and at least two light bars 600. The backplate 100 is divided into a border region and a middle region surrounded by the border region. The light guide plate 200 is disposed on the backplate 100. The light guide plate 200 includes a light incident side 210 and a light exit side 220. The optical film 300 is disposed on the light exit side 220 of the light guide plate 200. The sealant 400 is arranged outside the border region for supporting the display panel. The middle region of the backplate 100 includes a hollow portion. The light bar fixing plate 500 is arranged in the hollow portion of the backplate 100 and connected to the backplate 100. The two light bars 600 are fixed onto the light bar fixing plate 500, and the light emitting surfaces of the two light bars 600 face away from each other. The light emitting surfaces of the light bars 600 are perpendicular to the light exit side 220 of the light guide plate 200. The light produced by the two light bars 600 enters the light guide plate 200 through the light incident side 210 and exits from the light exit side 220 of the light guide plate 200 to realize the function of the backlight module 1000 to provide light. In this embodiment, the distance between the two light bars 600 is greater than or equal to 0, so as to prevent the space between the two light bars 600 from being too large resulting in weak light provided by the backlight module 1000 in this region and forming an obvious brightness difference with the light in other regions thus adversely affecting the display effect.

In the backlight module 1000 of this embodiment, two light bars 600 are arranged on the light bar fixing plate 500, and the light bar fixing plate 500 is connected to the middle region of the backplate 100, so that the two light bars 600 are located in the middle of the backplate 100, and the light emitting surfaces of the two light bars 600 are set away from each other. In this way, one light bar 600 can provide light for half of the backlight module 1000, and two light bars 600 can provide the light required by the entire backlight module 1000. Compared with the backlight module 1000 of the edge-lit design, the number of light bars 600 is set to two, which reduces the use intensity of the light bars 600 to a certain extent and prolongs the service life of the backlight module 1000. Furthermore, the two light bars 600 are arranged in the middle of the backplate 100, so that the display device with this backlight module 1000 can realize the four-sided ultra-thin design. Compared with the display devices equipped with the direct-lit backlight module 1000, the backlight module 1000 of this embodiment is thinner. In another aspect, compared with the display devices equipped with edge-lit backlight module 1000, this embodiment has differentiated characteristics and can better attract consumers in the market. Moreover, the display device provided with the backlight module 1000 of this embodiment can realize a four-sided ultra-thin design, which facilitates the narrow bezel and thinning of the display device.

Figure 4:
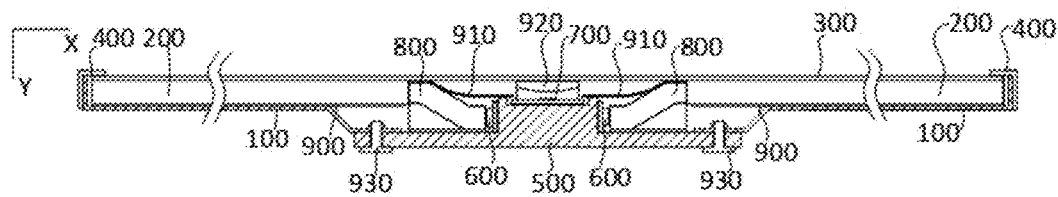
FIG. 4 is a schematic cross-sectional diagram of a backlight module according to a second embodiment of the present application.
Figure 5:
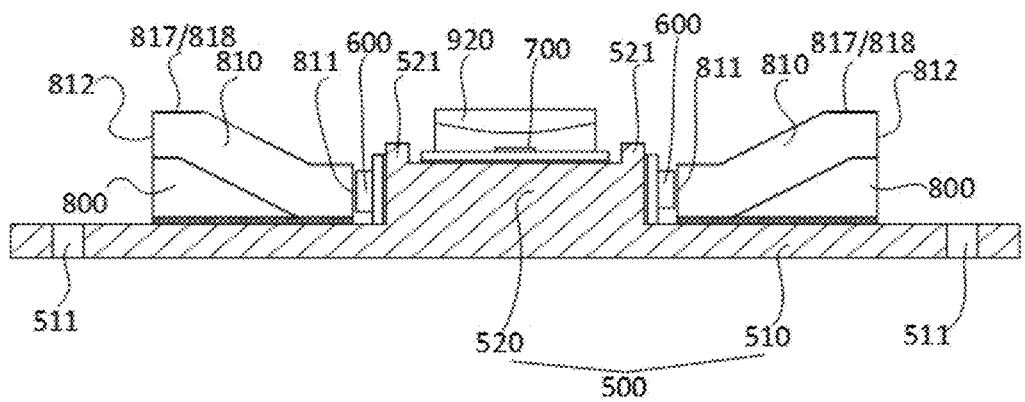
FIG. 5 is a schematic diagram of a light bar fixing plate, a light guide column, a light bar, an auxiliary light bar, and a half reflector in the second embodiment of the present application.
Figure 6:
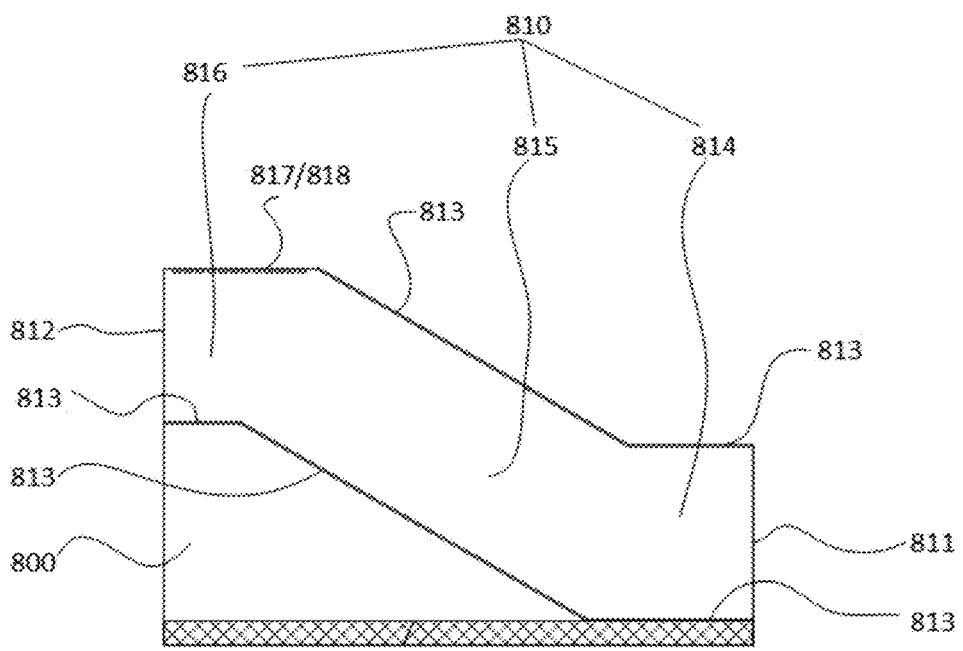
FIG. 6 is a schematic diagram of a light guide column in the second embodiment of the present application.

FIG. 4 is a schematic cross-sectional diagram of a backlight module according to a second embodiment of the present application. FIG. 5 is a schematic diagram of a light bar fixing plate, a light guide column, a light bar, an auxiliary light bar, and a half reflector in the second embodiment of the present application. FIG. 6 is a schematic diagram of the light guide column in the second embodiment of the present application. As shown in FIG. 4 to FIG. 6, as the second embodiment of the present application, which is an improvement of the first embodiment of the present application, a backlight module 1000 is disclosed. The backlight module 1000 further includes an auxiliary light bar 700. The light bar fixing plate 500 includes a connection plate 510 and a fixing portion 520, where the fixing portion 520 protrudes from the connection plate 510. The connection plate 510 is connected to the backplate 100. The two light bars 600 are respectively arranged on opposite sides of the fixing portion 520. The auxiliary light bar 700 is disposed on a side of the fixing portion 520 away from the connection plate 510. The light emitting surface of the auxiliary light bar 700 is arranged perpendicular to the light emitting surfaces of the light bars 600, and is arranged parallel to the light exit side 220 of the light guide plate 200. In this embodiment, the auxiliary light bar 700 provides light for the region between the two light bars 600. The light required by the backlight module 1000 is provided by the two light bars 600 and the auxiliary light bar 700. The brightness of the auxiliary light bar 700 is lower than that of the two light bars 600, so that the light intensity of the region between the two light bars 600 is nearly consistent with that of other regions of the backlight module 1000, avoiding the problem of uneven display brightness in the display device using the backlight module 1000. In general, the function of the auxiliary light bar 700 is to provide light for the interval region between the two light bars 600, so as to avoid uneven display brightness caused by uneven light intensity emitted from the backlight module 1000. However, if the interval region between the two light bars 600 is small, the difference in the intensity of light emitted from the backlight module 1000 is not obvious, then the auxiliary light bar 700 may not be provided.

In addition, in this embodiment, the light bar fixing plate 500 is an aluminum substrate. The two light bars 600 are bonded to the fixing portion 520 through a heat-conducting adhesive, and the auxiliary light bar 700 is also bonded to the fixing portion 520 through a heat-conducting adhesive. The heat produced by the light bars 600 and the auxiliary light bar 700 will be transferred to the light bar fixing plate 500 through the heat-conducting adhesive, so that the heat is concentrated on the light bar fixing plate 500. That is, most of the heat in the backlight module 1000 is concentrated in the middle of the backplate 100. This design also makes it convenient for designers to design the heat dissipation structure. In particular, it is only needed to set a heat dissipation structure corresponding to the light bar fixing plate 500 at the corresponding position of the rear case 3000. Compared with the edge-lit backlight module 1000, the heat produced by the backlight module 1000 is concentrated in the middle, which makes it easier to dissipate heat.

During the design process, the inventor has contemplated that the light bar 600 directly emits light to the light incident side 210 of the light guide plate 200. If the light bar 600 directly contacts the light guide plate 200, the heat produced by the light bar 600 may directly affect the light guide plate 200, making the use effect of the light guide plate 200 poor. However, if the light bar 600 and the light guide plate 200 are spaced apart, the emitted light may be lost to a certain extent before entering the light guide plate 200, and the intensity used by the light bar 600 will be increased in practice. In view of the above, the backlight module 1000 further includes a light guide column 800. The number of the light guide columns 800 is equal to the number of the light bars 600. The light guide column 800 is fixedly connected with the connection plate 510. The light guide column 800 includes a light guide channel 810. The light guide channel 810 includes a light-incoming end 811 and a light-outgoing end 812, where the light-incoming end 811 is located at the light emitting surface of the respective light bar 600, and the light-outgoing end 812 is located at the light incident side 210 of the light guide plate 200. In this way, the light produced by the light bar 600 enters through the light-incoming end 811 of the light guide channel 810, and exits from the light-outgoing end 812 of the light guide channel 810 into the light guide plate 200. In this process, through the guiding function of the light guide channel 810, the loss of the light produced by the light bar 600 before entering the light guide plate 200 is reduced. Furthermore, the light guide channel 810 includes a reflective coating 813. The light produced by the light bar 600 enters through the light-incoming end 811 of the light guide channel 810, is reflected by the reflective coating 813 in the light guide channel 810, and then exits from the light-outgoing end 812 of the light guide channel 810 to enter the light guide plate 200. The light will be mixed and reflected to a certain extent in the light guide channel 810, so that when it enters the light guide plate 200, it can be better dispersed. Moreover, a reflective coating 813 is provided in the light guide channel 810 to reduce the loss of light in the light guide channel 810. In this embodiment, the light guide column 800 is fixedly connected to the connection plate 510 through a double-sided adhesive. The light-incoming end 811 of the light guide channel 810 is arranged adjacent to the respective light bar 600, and the light-outgoing end 812 of the light guide channel 810 is arranged adjacent to the light guide plate 200. The light guide channel 810 is made of a transparent substrate. The transparent substrate may be polycarbonate PC, MS, or organic glass PMMA.

In order to make the light provided by the backlight module 1000 more uniform and reduce the loss of light produced by the light bar 600, the backlight module 1000 further includes a first reflective sheet 900, a second reflective sheet 910 and a half reflector 920. The first reflective sheet 900 is disposed on the side of the light guide plate 200 adjacent to the backplate 100. When the light produced by the light bar 600 is guided by the light guide column 800 and enters the light incident side 210 of the light guide plate 200, the light is mixed and dispersed in the light guide plate 200. The direction of divergence is that the light that is far away from the optical film 300 will be reflected by the first reflective sheet 900, so that the direction of the light is reversed or shifted, so that most of the light entering the light guide plate 200 can be emitted from the light exit side 220 of the light guide plate 200, to provide light for the display device. The half reflector 920 is disposed at the end of the auxiliary light bar 700 away from the fixing portion 520. Half of the light produced by the auxiliary light bar 700 will pass through the half-reflector 920 and continue to emit, and the other half will be reflected by the half-reflector 920, so that the light direction is reversed or shifted. In this case, there are two second reflective sheets 910, and they are respectively arranged on both sides of the auxiliary light bar 700. The light reflected by the half reflector 920 will contact the two second reflective sheets 910, so that the light is emitted towards the direction of the optical film 300. By arranging the first reflective sheet 900, the second reflective sheet 910, and the half reflector 920, the backlight module 1000 can provide light to uniformly illuminate the entire display panel 2000. In this embodiment, the half-reflector 920 is spaced from the auxiliary light bar 700 so that the light produced by the auxiliary light bar 700 passes through the half-reflector 920 or is reflected by the half-reflector 920, with a certain light mixing distance, so that the light intensity emitted by the auxiliary light bar 700 is uniform.

In this embodiment, the light guide plate 200 of the backlight module 1000 is not located on the same level as the light bar 600. As shown in FIG. 4, the distance between the light bar 600 and the optical film 300 is greater than the distance between the light guide plate 200 and the optical film 300. The light guide channel 810 includes a first channel 814, a second channel 815 and a third channel 816. The second channel 815 connects the first channel 814 with the third channel 816. The light-incoming end 811 is located in the first channel 814, and the light-outgoing end 812 is located in the third channel 816. The third channel 816 includes a first horizontal plane 817, where the first horizontal plane 817 is located adjacent to the optical film 300, and the first horizontal plane 817 is arranged perpendicular to the light-outgoing end 812. In this way, both the first horizontal plane 817 of the light guide column 800 and the light guide plate 200 can support the optical film 300. The first channel 814 and the third channel 816 are arranged horizontally, and the first channel 814 and the third channel 816 are arranged in parallel. In this way, when the light enters the first channel 814 through the light-incoming end 811, most of the light produced by the light bar 600 can enter and be guided to the second channel 815 in the first channel 814. On the outside of the second channel 815 is a reflective coating 813, so the light is reflected and mixed in the second channel 815 making the light more condensed, and then is guided to the third channel 816 and emitted through the light-outgoing end 812 of the third channel 816, and then enters the light guide plate 200 through the light incident side 210 of the light guide plate 200. In general, the first channel 814 and the third channel 816 are arranged horizontally, and the light-incoming end 811 is parallel to the light exit surface of the light bar 600, and the light-outgoing end 812 is parallel to the light incident side 210 of the light guide plate 200, in order to facilitate the emission and entry of light to the greatest extent. The second channel 815 serves as a channel connecting the first channel 814 and the third channel 816. The second channel 815 can be inclined as shown in FIG. 6 or vertical, which is not limited here, and designers can design the shape of the light guide channel according to actual needs.

Because the first horizontal plane 817 is in direct contact with the optical film 300, the light guide column 800 can support the optical film 300. In this case, the light that can be provided by the position of the first horizontal plane 817 is only the light scattered from the light guide channel 810, and the light intensity is not equal to the light intensity provided by the auxiliary light bar 700 and the light intensity provided by the light guide plate 200, which will cause the light provided by the position of the first horizontal plane 817 to be brighter or darker. Therefore, the inventor thought of setting a dot surface 818 on the first horizontal plane 817 of the light guide channel 810, where the dot surface 818 is just located in the gap between the first reflective sheet 900 and the second reflective sheet 910, that is, between the region illuminated by the light guide plate 200 and the region illuminated by the auxiliary light bar 700. One end of the dot surface 818 is in contact with the light incident side 210 of the light guide plate 200, and the other end is in contact with the second reflective sheet 910. The dot surface 818 includes a plurality of shading strips, and the plurality of shading strips are arranged at intervals. When assembling the backlight module 1000, the staff can adjust the spacing between the plurality of shading strips on the dot surface 818 according to the difference between the light intensity provided by the first horizontal plane 817 and the light intensity of the surrounding regions, so as to control the brightness of the light that can pass through the dot surface 818 by controlling the spacing distance of the shading strips on the dot surface 818, thereby controlling the brightness of the light on the first horizontal plane 817.

As shown in FIG. 5, two mounting protrusions 521 are provided on the side of the fixed portion 520 away from the connection plate 510, where the two mounting protrusions 521 are located on both sides of the auxiliary light bar 700 respectively. One end of the second reflective sheet 910 on one side of the auxiliary light bar 700 abuts against the mounting protrusion 521 on the same side of the auxiliary light bar 700, and the other end of the second reflective sheet 910 abuts against the end of the first horizontal plane 817 on the light guide column 800 on the same side of the auxiliary light bar 700 that is adjacent to the auxiliary light bar 700. That is, one end of the second reflective sheet 910 on the left side of the auxiliary light bar 700 abuts against the mounting protrusion 521 on the left side of the auxiliary light bar 700, and the other end of the second reflective sheet 910 abuts against the first horizontal plane 817 on the light guide column 800 on the left side of the auxiliary light bar 700. The second reflective sheet 910 on the right side of the auxiliary light bar 700 abuts against the mounting protrusion 521 on the right side of the auxiliary light bar 700 and abuts against the first horizontal plane 817 on the light guide column 800 on the right side of the auxiliary light bar 700. The two second reflective sheets 910 are arranged symmetrically with respect to the auxiliary light bar 700. In this embodiment, by setting the mounting protrusions 521, the end of the second reflective sheet 910 close to the auxiliary light bar 700 is not on the same level as the auxiliary light bar 700, which reduces the influence of the heat produced by the auxiliary light bar 700 on the second reflective sheet 910 to a certain extent. Furthermore, the mounting protrusions 521 can also support the second reflective sheet 910 to prevent the second reflective sheet 910 from being damaged during use.

In this embodiment, the backlight module 1000 further includes fixing screws 930. The middle region of the backplate 100 defines a first connection hole 110, the connection plate 510 defines a second connection hole 511, and the fixing screw 930 passes through the second connection hole 511 and is threadedly connected with the first connection hole 110 to connect the light bar fixing plate 500 with the backplate 100. Of course, other connection methods can also be used, such as connecting by pins, or connecting by magnetic attraction. In addition, the connection plate 510 is located on the side of the backplate 100 away from the optical film 300. In this way, the heat produced when the light bar 600 and the auxiliary light bar 700 are operating can be absorbed by the fixing portion 520 of the light bar fixing plate 500 and transferred to the connection plate 510, and the connection plate 510 can dissipate heat in a large area, so as to facilitate the heat dissipation of the backlight module 1000 and prevent damage caused by excessive heat accumulation.

Figure 7:
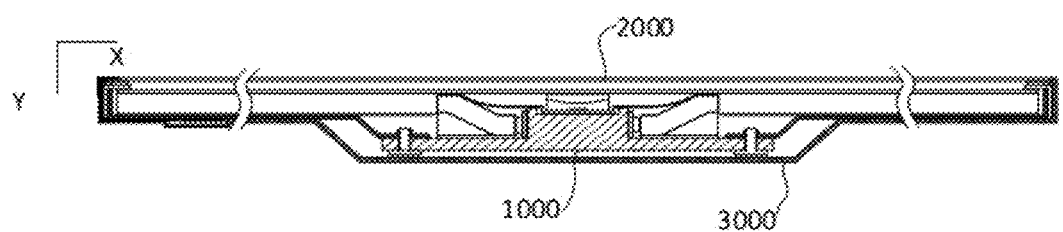
FIG. 7 is a schematic cross-sectional diagram of a display device according to a third embodiment of the present application.
Figure 8:
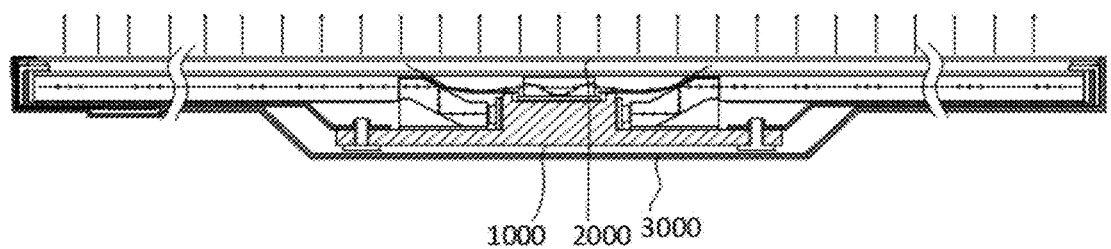
FIG. 8 is a schematic diagram of light paths of a display device according to the third embodiment of the present application.

FIG. 7 is a schematic cross-sectional diagram of a display device according to a third embodiment of the present application. FIG. 8 is a schematic diagram of light paths of a display device according to the third embodiment of the present application. The x-axis direction in the figures is the sky side in a display panel, and the −x-axis direction in the figures is the ground side in the display panel. As shown in FIG. 7 and FIG. 8, as the third embodiment of the present application, a display device is disclosed. The display device includes a display panel 2000, a rear case 3000 and a backlight module 1000 as described in the above embodiments. The rear case 3000 includes a heat dissipation region, and the heat dissipation region coincides with the position of the middle region of the backplate 100. The heat dissipation region of the rear case 3000 defines a plurality of heat dissipation holes, and the plurality of heat dissipation holes cover the position of the light bar fixing plate 500, so that the heat concentrated at the light bar fixing plate 500 can be dissipated through the heat dissipation holes. The heat dissipation holes form relatively strong air convection to conduct heat away.

In addition, when installing the display device of the present application, first assemble the backlight module 1000, install the light bar 600 and the auxiliary light bar 700 onto the light bar fixing plate 500 with a heat-conducting adhesive, and use screws to fix the light bar fixing plate 500 to the backplate 100, then assemble the first reflective sheet 900, the second reflective sheet 910, the light guide column 800, the light guide plate 200, and the half reflector 920 at the corresponding positions, then put the optical film material in sequence, and assemble and clamp the sealant 400 on the backplate 100, thereby completing the assembly of the backlight module 1000. Then attach the Foam tape on the sealant 400, bond the liquid crystal display panel 2000, and fold the PCB board onto the backplate 100, then glue and fix it, and then assemble the rear case 3000. In the above process, in order to improve the appearance and quality of the product and protect the liquid crystal display panel, a Mylar® sheet is bonded to the COF line section of the liquid crystal display panel to protect the COF, thereby completing the assembly of the entire display device.

Generally speaking, in the display device of the present application, the light-emitting assembly of the backlight module 1000 is arranged in the middle of the display panel 2000, so that the display device can realize four-sided borderless, that is, four-sided ultra-thin design, which is obviously different from the current mainstream products in the market, with obvious differentiated characteristics, which can effectively improve product competitiveness. In addition, the rear case 3000 includes a heat dissipation region at the corresponding position of the light-emitting assembly, and the heat produced by the light-emitting assembly can be concentrated in the middle of the display panel 2000, which facilitates heat dissipation of the display device.

The technical solutions of the present application can be widely used in various display panels, such as TN (Twisted Nematic) display panels, IPS (In-Plane Switching) display panels, VA (Vertical Alignment) display panels, and MVA (Multi-Domain Vertical Alignment) display panels. Of course, other types of display panels, such as OLED (Organic Light-Emitting Diode) display panels, may also be applicable to the above solutions.

It should be noted that the inventive concept of the present application can be formed into many embodiments, but the length of this application document is limited and so these embodiments cannot be enumerated one by one. The technical features can be arbitrarily combined to form a new embodiment, and the original technical effect may be enhanced after the various embodiments or technical features are combined.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, which shall all be regarded as falling in the scope of protection of this application.

What is claimed is:

1. A backlight module, comprising:
a backplate, divided into a border region and a middle region surrounded by the border region, wherein the middle region of the backplate comprises a hollow portion;
a light guide plate, arranged on the backplate and comprising a light incident side and a light exit side;
an optical film, arranged on the light exit side of the light guide plate;
a light bar fixing plate, arranged in the hollow portion of the backplate and connected with the backplate; and
at least two light bars, fixed onto the light bar fixing plate, wherein light emitting surfaces of the at least two light bars are disposed to face away from each other and are further disposed perpendicular to the light exit side of the light guide plate;
wherein light produced by the at least two light bars is operative to enter the light guide plate through the light incident side, and then exit the light guide plate from the light exit side;
wherein the backlight module further comprises an auxiliary light bar, wherein the light bar fixing plate comprises a connection plate and a fixing portion protruding from the connection plate, wherein the connection plate is connected with the backplate, the at least two light bars are respectively arranged on opposite sides of the fixing portion, and wherein the auxiliary light bar is arranged on a side of the fixing portion facing away from the connection plate;
wherein a light emitting surface of the auxiliary light bar is disposed perpendicular to the light emitting surface of each of the at least two light bars, and parallel to the light exit side of the light guide plate;
wherein the backlight module further comprises a first reflective sheet, disposed on a side of the light guide plate adjacent to the backplate, and operative to reflect light entering the light guide plate;
two second reflective sheets, respectively arranged on both sides of the auxiliary light bar; and
a half reflector, arranged at an end of the auxiliary light bar facing away from the fixing portion, wherein half of the light produced by the auxiliary light bar is reflected by the half reflector, and another half of the light produced by the auxiliary light bar is emitted through the half-reflector;
wherein the second reflective sheet is configured to reflect the light reflected by the half reflector;
wherein the backlight module further comprises light guide columns provided in a number equal to a number of the at least two light bars, wherein the light guide columns are fixedly connected with the connection plate, wherein each light guide column comprises a light guide channel, which comprises a light-incoming end and a light-outgoing end, wherein the light-incoming end is disposed at the light emitting surface of the respective light bar, and the light-outgoing end is disposed at the light incident side of the light guide plate; wherein the light produced by the respective light bar is operative to enter the light guide channel through the light-incoming end before being emitted from the light-outgoing end to enter the light guide plate;
wherein each light guide channel comprises a reflective coating, and the light produced by the respective light bar is operative to enter the light guide channel through the light-incoming end, be reflected by the reflective coating in the light guide channel, and then exit from the light-outgoing end to enter the light guide plate.

2. The backlight module as recited in claim 1, wherein a distance separating the at least two light bars from the optical film is greater than a distance separating the light guide plate from the optical film, wherein each light guide channel comprises a first channel, a second channel, and a third channel, wherein the second channel connects the first channel and the third channel together; wherein the light-incoming end of the light guide channel is located in the first channel, the light-outgoing end is located in the third channel, wherein the third channel comprises a first horizontal plane that is located adjacent to the optical film and that is perpendicular to the light-outgoing end.

3. The backlight module as recited in claim 2, wherein a dot surface is disposed on the first horizontal plane, wherein one end of the dot surface abuts against the light-incident side of the light guide plate, and another end of the dot surface abuts against the second reflective sheet, wherein the dot surface comprises a plurality of shading strips arranged at intervals.

4. The backlight module as recited in claim 2, wherein two mounting protrusions are disposed on the side of the fixing portion facing away from the connection plate, wherein the two mounting protrusions are respectively disposed on both sides of the auxiliary light bar, wherein one end of the second reflective sheet on one side of the auxiliary light bar abuts on the respective mounting protrusion on the same side of the auxiliary light bar, another end of the second reflective sheet abuts against one end of the first horizontal plane on the respective light guide column on the same side of the auxiliary light bar that is adjacent to the auxiliary light bar.

5. The backlight module as recited in claim 1, further comprising a fixing screw, wherein a first connection hole is defined in a middle region of the backplate, and a second connection hole is defined in the connection plate, wherein the fixing screw passes through the second connection hole before being threadedly connected with the first connection hole to connect the backplate and the light bar fixing plate together;
wherein the connection plate is disposed on a side of the backplate away from the optical film.

6. A display device, comprising a display panel, a rear case, and a backlight module, wherein the backlight module comprises:
a backplate, divided into a border region and a middle region surrounded by the border region, wherein the middle region of the backplate comprises a hollow portion;
a light guide plate, arranged on the backplate and comprising a light incident side and a light exit side;
an optical film, arranged on the light exit side of the light guide plate;
a light bar fixing plate, arranged in the hollow portion of the backplate and connected with the backplate; and
at least two light bars, fixed onto the light bar fixing plate, wherein light emitting surfaces of the at least two light bars are disposed to face away from each other and are further disposed perpendicular to the light exit side of the light guide plate;
wherein light produced by the at least two light bars is operative to enter the light guide plate through the light incident side, and then exit the light guide plate from the light exit side;

wherein the backlight module further comprises an auxiliary light bar, wherein the light bar fixing plate comprises a connection plate and a fixing portion protruding from the connection plate, wherein the connection plate is connected with the backplate, the at least two light bars are respectively arranged on opposite sides of the fixing portion, and wherein the auxiliary light bar is arranged on a side of the fixing portion facing away from the connection plate;

wherein a light emitting surface of the auxiliary light bar is disposed perpendicular to the light emitting surface of each of the at least two light bars, and parallel to the light exit side of the light guide plate;

wherein the backlight module further comprises a first reflective sheet, disposed on a side of the light guide plate adjacent to the backplate, and operative to reflect light entering the light guide plate;

two second reflective sheets, respectively arranged on both sides of the auxiliary light bar; and a half reflector, arranged at an end of the auxiliary light bar facing away from the fixing portion, wherein half of the light produced by the auxiliary light bar is reflected by the half reflector, and another half of the light produced by the auxiliary light bar is emitted through the half-reflector;

wherein the second reflective sheet is configured to reflect the light reflected by the half reflector;

wherein the backlight module further comprises light guide columns provided in a number equal to a number of the at least two light bars, wherein the light guide columns are fixedly connected with the connection plate, wherein each light guide column comprises a light guide channel, which comprises a light-incoming end and a light-outgoing end, wherein the light-incoming end is disposed at the light emitting surface of the respective light bar, and the light-outgoing end is disposed at the light incident side of the light guide plate; wherein the light produced by the respective light bar is operative to enter the light guide channel through the light-incoming end before being emitted from the light-outgoing end to enter the light guide plate;

wherein each light guide channel comprises a reflective coating, and the light produced by the respective light bar is operative to enter the light guide channel through the light-incoming end, be reflected by the reflective coating in the light guide channel, and then exit from the light-outgoing end to enter the light guide plate;

wherein a heat dissipation region is disposed on the rear case, wherein a position of the heat dissipation region coincides with the middle region of the backplate.

7. The backlight module as recited in claim 1, wherein a distance between the at least two light bars is greater than or equal to zero.

8. The backlight module as recited in claim 1, wherein a brightness of the auxiliary light bar is lower than a brightness of each of the at least two light bars.

9. The backlight module as recited in claim 1, wherein the light bar fixing plate is an aluminum substrate, wherein the at least two light bars are bonded to the fixing portion of the light bar fixing plate by a heat-conducting adhesive, and the auxiliary light bar is bonded to the fixing portion through a heat-conducting adhesive.

10. The backlight module as recited in claim 1, wherein each light guide column is fixedly connected to the connection plate through a double-sided adhesive tape, wherein the light-incoming end of the light guide channel of each light guide column is disposed adjacent to the respective light bar, and the light-outgoing end of the light guide channel is disposed adjacent to the light guide plate; wherein the light guide channel is made of a transparent substrate.

11. The backlight module as recited in claim 1, wherein the half reflector is spaced apart from the auxiliary light bar.

12. The backlight module as recited in claim 2, wherein the first channel and the third channel of each light guide column are arranged horizontally, wherein the light-incoming end of the light guide column is parallel to the light-emitting surface of the respective light bar, and the light-outgoing end of the light guide column is parallel to the light incident side of the light guide plate.

13. The display device as recited in claim 6, wherein there are defined a plurality of heat dissipation holes in the heat dissipation region of the rear case, wherein the plurality of heat dissipation holes cover the position of the light bar fixing plate.

* * * * *

UNITED STATES PATENT AND TRADEMARK OFFICE
CERTIFICATE OF CORRECTION

| | | |
|---|---|---|
| PATENT NO. | : 11,815,710 B1 | Page 1 of 1 |
| APPLICATION NO. | : 18/211297 | |
| DATED | : November 14, 2023 | |
| INVENTOR(S) | : Xiaohui Yang | |

It is certified that error appears in the above-identified patent and that said Letters Patent is hereby corrected as shown below:

On the Title Page

Column 1, Foreign Application Priority Data field, insert --September 08, 2022 (CN) 2022110926913--.

Signed and Sealed this
Fifth Day of March, 2024

Katherine Kelly Vidal
*Director of the United States Patent and Trademark Office*